Jan. 26, 1954  L. D. MARTIN  2,667,090
METHOD OF MAKING GEAR TOOTH SHAVING TOOLS
Filed Dec. 4, 1952
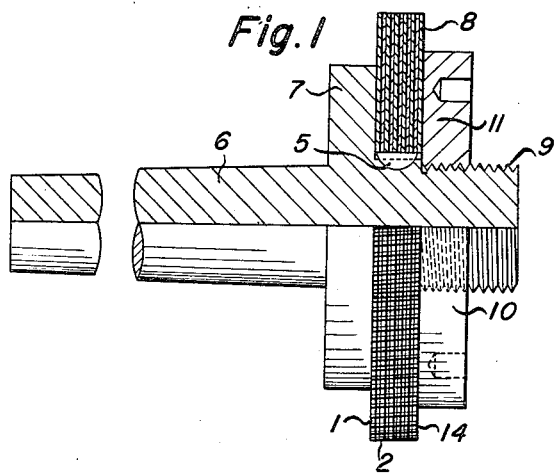
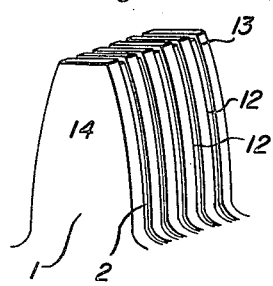
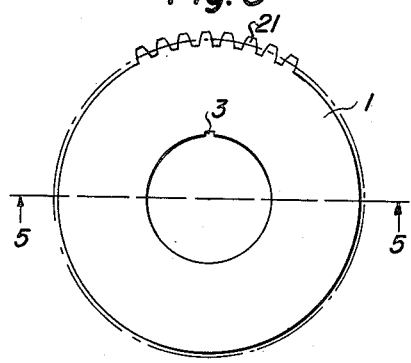
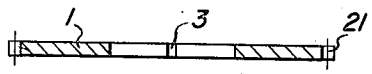
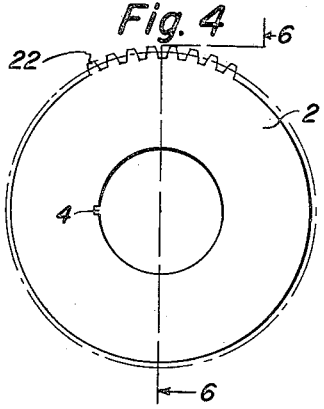
LOUIS D. MARTIN
INVENTOR.
BY *Daniel I. Maguire*
*Donald H. Stewart*
ATTORNEYS Patented Jan. 26, 1954

2,667,090

UNITED STATES PATENT OFFICE 2,667,090

METHOD OF MAKING GEAR TOOTH SHAVING TOOLS

Louis D. Martin, Rochester, N. Y., assignor to Eastman Kodak Company, Rochester, N. Y., a corporation of New Jersey Application December 4, 1952, Serial No. 324,068

4 Claims. (Cl. 76—101)

This invention relates to a method of making a shaving tool for gear teeth. The tool generally resembles spur or helical gears on which cutting edges, generally known as "serrated" shaving edges, are formed. The tool and shaving edges must both be of a high degree of accuracy to be of the maximum use.

In the past, rotary shaving tools have been made of one solid piece of steel. After forming the teeth, the cutting edges have automatically been made by either of two methods.

First, for the coarser pitches, such as, for instance, a 20 diametral pitch or coarser, it has been customary to form the cutting edges by skiving out of the solid face of the tool grooves of the desired depth and width. The depth of the skive-groove is limited by the strength required in the tool. If too deep, this strength is lessened because there is a greater unsupported area of the tooth adjacent the skive-groove. If too shallow, it does not provide sufficient depth for chip clearance, and it does not provide sufficient stock for regrinding of the profile when the tool becomes dull. Because the skive-groove is shaped by a reciprocating cutter, and because the cutting edge of such a tool breaks down, the sides of the skive-groove are neither smooth nor sharp. Tools made by skiving are difficult to produce, requiring superior workmanship, and they are consequently costly. The cutting of the skive-groove and the recess provided for the shaping tool used to produce it is a slow and costly operation. In such tools, if any portion of the tooth profile is damaged, the tool is usually a total loss.

A second known method of making rotary shaving tools is used primarily in fine pitch cutters, say, for instance, of 20 diametral pitch or finer. These tools are produced by grinding annular grooves in the cutter transverse to the axis of rotation. The width and pitch of the groove are dependent on the diametral pitch of the shaving tool and the material to be shaved. These grooves are usually milled in the tool before it is hardened and the profile shape ground. Therefore, the edges of the grooves are never very smooth and sharp. There is an additional disadvantage in that such an operation leaves a relatively large area of the shaving teeth between the grooves unsupported. The annular grooves are oftentimes filled with chips which cause the unsupported teeth to break out, causing irreparable damage to the cutter.

One object of my invention is to overcome the difficulties in manufacturing shaving tools of the type described above. Another object of my invention is to provide a method of producing a serrated gear shaving tool which is less expensive than gear shaving tools heretofore used. Another object of my invention is to provide a method of making a shaving tool in which increased accuracy is made possible. A still further object of my invention is to provide a method of making serrated shaving edges in which extreme accuracy in the cutting edges is obtainable so that the edges may be uniformly smooth and sharp. A still further object of my invention is to provide a method of making the grooves or serrated cutting edges of exactly the required depth so that by limiting this depth, practically the entire area of the teeth having the cutting edges may be supported. A still further object of my invention is to provide a method for forming serrated cutting teeth in which the tool may be readily resharpened and restored to its original cutting condition without any tendency of warping or distorting the cutting edges of the tool and, at the same time, retaining the selected groove depth. Other objects will appear from the following specification, the novel features being particularly pointed out in the claims at the end thereof.

Coming now to the drawings in which like reference characters denote like parts throughout:

Fig. 1 is a part section, part side elevation of a typical gear tooth shaving tool made in accordance with my improved method;

Fig. 2 is a schematic perspective view of a skived cutting tooth on a greatly enlarged scale to illustrate the form of the cutting teeth produced by my new method and shown in Fig. 1;

Fig. 3 is a front elevation of a cutting component of the gear shaving tool shown in Fig. 1;

Fig. 4 is a similar view of a spaced component removed from the tool shown in Fig. 1;

Fig. 5 is a section taken on line 5—5 of Fig. 3; and

Fig. 6 is a section taken on line 6—6 of Fig. 4.

My present invention comprises a shaving tool of built-up construction in which a solid block of steel is not used. I prefer to employ a series of hardened and ground and lapped discs made of high-speed steel. These may have roughed-out gear teeth, as in the case of coarse pitch tools, and similar shaped discs, preferably of tinned brass or copper, may be laminated with or sandwiched between the steel discs. If steel discs are provided with roughed-out teeth, the brass or copper discs should be likewise provided with such teeth. The whole assembly is preferably retained with each disc in predetermined relationship by a suitable arbor. This can readily be done by providing a key-way so that in assembly a correct alinement of steel, brass and/or copper discs may be made. These discs can be accurately ground to a predetermined thickness so that the spacing between the steel discs can be made quite exact. The laminated discs required for the shaving tool, either provided with roughed-out teeth or without such teeth, may be formed into a solid block by known methods, such as induction heating under pressure or with an open flame torch under pressure or the like. While mounted on an arbor, the discs are provided with finished teeth, ground in the same manner as other shaving tools are ground. This will provide extremely accurate teeth extending completely across the laminated block.

In order to convert the laminated gear thus formed into a shaving tool with skiving grooves, it is submerged in a concentrated solution of an acid attacking the brass or copper, but not the steel discs (such as a concentrated solution of nitric acid or potassium cyanide) so that the brass or copper sections may be etched out a suitable amount below the surface of the teeth previously formed thereon and below the surface of the steel sections. The etching process gives a skive-groove of selective depth which can be varied at will to suit cutting conditions such as for different materials. The construction of a skive-groove in this manner for tools of fine pitch as, for instance, 20 diametral pitch and finer, is particularly desirable because it supports the teeth against cutting pressure, thus overcoming the weakness of the annular groove method of producing skive-grooves and preventing loading of the annular groove by chips.

When the tool becomes dull or worn, the profile of the shaving tool teeth may be reground and the groove can be reestablished for any given condition by again repeating the etching process. This will reduce the size of the teeth in the brass or copper discs by an amount necessary to provide the proper chip clearance between the remaining cutting edges of the steel discs. Thus, a much keener cutting edge can be produced by this method than with the old method of producing skive-grooves which often resulted in inaccurate and ragged cutting edges that broke down under the required cutting pressures.

It is also possible with my improved method to salvage a tool in certain instances where the teeth on one steel disc may become damaged as such a disc can be removed and a new one inserted, although it will, of course, be necessary to regrind the block which must be again sweated into a unitary structure before the grinding operation which can be carried out in the original manner. It is believed that there is an additional advantage in the laminated tool construction in that the brass or copper sheets have a certain amount of resiliency and there is a cushioning effect because of this fact which tends to prevent distortion or "digging in" during the cutting operation.

Fig. 1 shows a typical example of a preferred form of tool made by my improved method. This view indicates that there are a series of steel discs 1 which are preferably high-speed steel separated by nonferrous metal discs 2, these components including key slots 3 in the discs 1 and 4 in the discs 2 to be engaged by a key 5 in the arbor 6 which includes an annular shoulder 7 lying on one side of the block designated broadly as 8 and having a threaded portion 9. Each of the component discs 1 and 2 may be accurately finished to size and the surfaces accurately ground or otherwise brought into parallel relationship. An annular nut 10 is screwed onto the thread 9 so that the flat face 11 will, with the annular member 7, hold the block in a rigid position.

The components 1 are preferably accurately formed as indicated above and, if the cutter is for very coarse teeth, the periphery of the disc 1 may be provided with roughed-out gear teeth 21. The copper or brass discs 2 are united to the discs 1 over their entire abutting surfaces. In the case of coarse teeth, these discs may also have roughed-out teeth 22 but, in any event, the parts are then formed into an integral block which is preferably carried by an arbor.

The relative thickness of the components 1 and 2 may be varied to suit the particular work at hand. They may be of the same or of different thicknesses.

When the discs are assembled on the arbor, either spur or helical teeth may be formed thereon, depending on its function. After they are welded into a solid block, as by induction heating under pressure, or by an open flame torch or otherwise, the teeth are carefully finished in the same manner as other shaving tool teeth and are carefully ground to accuracy. If necessary, the teeth may also be lapped.

In the case of tools having relatively fine pitch, such as, for instance, of 20 diametral pitch and finer, it may be desirable to avoid roughing-out the teeth and grind them directly into the solid block formed from the steel and nonferrous metal components. As the teeth in such a block are ground, since the structure is unitary, an extremely high degree of accuracy may be obtained by the grinding and, if required, a lapping operation.

After the desired finish is obtained, the block may be placed in an etching bath, such as a concentrated solution of nitric acid or potassium cyanide, and the brass or copper components may be etched so that the outer surfaces thereof will lie a suitable distance between the steel components 1, thereby leaving grooves 12 between the components as indicated in Fig. 2. These grooves 12 serve the purpose of gashes but they are much more desirable when made in this manner because it is obvious that such an etching step does not tend to warp, distort or change the accurate shape and finish which has been produced by the grinding and/or lapping operations and so that the cutting edges 13 of the steel teeth 14 remain in the exact shape in which they were made with sharp, accurately-formed edges.

It should be noted that when such a shaving tool becomes dull or worn, the depth of the serrations or grooves can be reestablished for any given condition by again repeating the etching operation. Because the etching solution attacks only the brass or copper components 2 and not the steel components 1, a much keener cutting edge is produced on the tool by this method than by the usual methods of skiving the grooves which may well produce ragged cutting edges that may break down rapidly under cutting pressures.

Another advantage of the laminated construction is that in a chipped or broken tool, it is possible to sometimes salvage the tool because it is possible to replace one component relative to the remaining ones, although this work requires that the entire assembly be re-ground and, if necessary, lapped in the original manner. Another advantage of my improved method is the support given to the steel components by the copper components. Since the depth of the grooves varies from .001" to .003" for fine pitch teeth, such as 20 pitch and finer, and perhaps from .005" to .010" for coarse pitch teeth for perhaps 20 pitch and up, it will be seen that the unsupported area of the steel components 1 is extremely slight due to the depth of these grooves and the remainder of the teeth is in effect a solid integral block.

These figures are given by way of example as it may obviously be desirable to provide grooves of greater or less depth according to the work to be done. As is well known in most skive-type gear teeth shaving tools, the depth of the skive-groove is generally two or three times the size of the cut to be shaved from a gear and, since the shaving operation may remove, say, .001" with relatively fine pitch teeth, it is desirable to have the skive-groove only several times this depth so that the support for the steel components will be very firm. A relatively solid support is desirable as considerable pressure is at times applied to such tools.

While I have specified copper or brass components to space the steel components of the block, it is obvious that other nonferrous materials may be used, such as aluminum, or that it may be possible to use different grades of steel for the different components but I find that copper and various brasses are perhaps the most suited for carrying out my improved method of producing shaving tools.

While I have described the preferred method of manufacturing a gash-type of gear shaving tool well suited for making such tools in production, it is obvious that various changes may be made without departing from the scope of the appended claims.

Having thus described my invention, what I claim is new and desire to secure by Letters Patent of the United States is:

1. A method of making a gear tooth shaving tool comprising building up a block out of components comprising alternate steel and nonferrous plates, permanently uniting these components over their entire abutting surfaces, forming teeth on the block transversely of the components, reducing the dimensions of the nonferrous components sufficiently to expose sharp edges of the steel components by etching the nonferrous components until grooves about the teeth of the steel components are formed of the desired depth.

2. A method of making a gear tooth shaving tool comprising building up a block out of components comprising alternate steel and nonferrous plates, having roughed-out teeth of the same contour in registration, permanently uniting these components over their entire abutting surfaces, grinding the block to accurately shape the roughed-out teeth of the components to the desired size and shape, and reducing the size of the nonferrous components to provide grooves between the steel components by etching in a suitable solution attacking the nonferrous metal components but not the steel components to expose the sharp cutting edges of the steel components.

3. A method of making a gear tooth shaving tool comprising building up a block out of components comprising hard steel plates and soft nonferrous plates, the hard steel plate components and the soft nonferrous plates being alternately arranged and securely united over their facing surfaces, forming teeth on the edges of the block and into the edges of the component plates, and treating the block thus formed with an etching fluid attacking the softer components but not the hard components to expose the sharp cutting edges of the steel components.

4. The method of making a shaving tool for gear teeth which comprises the steps of arranging alternate plates of tool steel and tinned nonferrous metal both with roughed-out teeth into a pile with the teeth all in registration, welding all the plates into an integral block, accurately finishing the roughed-out teeth of the block, reducing the size of the nonferrous teeth by etching out the nonferrous material with an etching fluid attacking the nonferrous material but not attacking the steel portions of the integral block, thereby leaving grooves between the steel plates and exposing the sharp edges of the steel plates to provide shaving edges and shaving chip clearance space between the steel plates, the nonferrous metal areas integrally supporting all that area of the steel teeth lying inside of the grooves.

LOUIS D. MARTIN.

References Cited in the file of this patent
UNITED STATES PATENTS

| Number | Name | Date |
|---|---|---|
| 1,546,418 | Stresau | July 21, 1925 |
| 1,571,559 | Smith | Feb. 2, 1926 |
| 1,662,026 | Brophy | Mar. 6, 1928 |
| 1,844,566 | Dienes | Feb. 9, 1932 |
| 1,904,100 | Taylor | Apr. 18, 1933 |
| 2,119,298 | Simowski | May 31, 1938 |
| 2,171,325 | Hawgood | Aug. 29, 1939 |